United States Patent [19]

Kroopp

[11] 3,969,031
[45] July 13, 1976

[54] ASSEMBLY OF STRUCTURAL MEMBERS

[76] Inventor: Karl-Gunnar Kroopp, Farnebogatan 62, 123 42 Farsta, Sweden

[22] Filed: Nov. 15, 1974

[21] Appl. No.: 524,054

[52] U.S. Cl. .............................. 403/239; 403/189; 403/178
[51] Int. Cl.² ........................ F16B 9/00; B25G 3/00
[58] Field of Search .......... 403/189, 191, 231, 174, 403/178, 239, 264, 290, 343, 240, 241, 406, 373, 245, 246, 238; 52/758 C

[56] References Cited
UNITED STATES PATENTS

| 3,338,602 | 8/1967 | Arnd | 403/264 X |
| 3,811,785 | 5/1974 | Hagglund | 403/264 X |

Primary Examiner—Wayne L. Shedd
Attorney, Agent, or Firm—Brumbaugh, Graves, Donohue & Raymond

[57] ABSTRACT

A coupling assembles structural members at least one of which has an opening and another of which has grooves extending along its outer surface. The coupling has two yieldably spaced body portions inserted within the opening of the one structural member. Each body portion has a claw which protrudes from the opening in the one member and is received in a groove of the other structural member. A fastener extends between the yieldably spaced body portions for moving the body portions until each claw grips a side of the groove in which it is received to assemble the structural members. The fastener also connects the structural member having the opening to the coupling and the claws and grooves have cooperatively inclined gripping surfaces for drawing the one structural member into firm butting engagement with the other when the claws grip the grooves.

5 Claims, 4 Drawing Figures

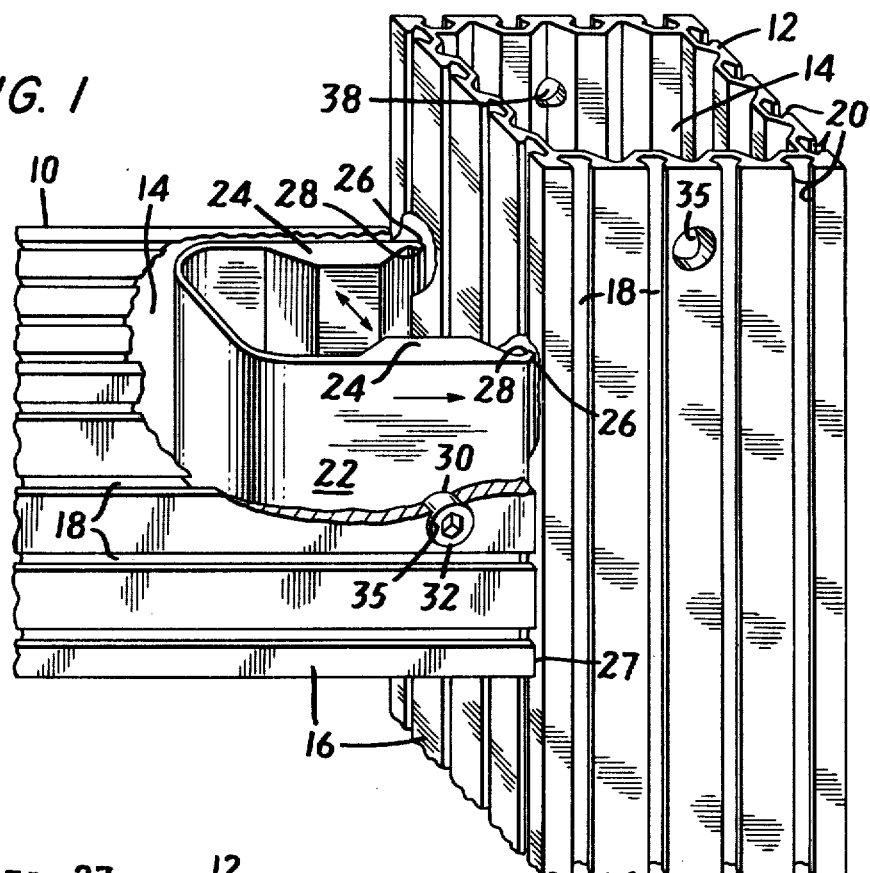
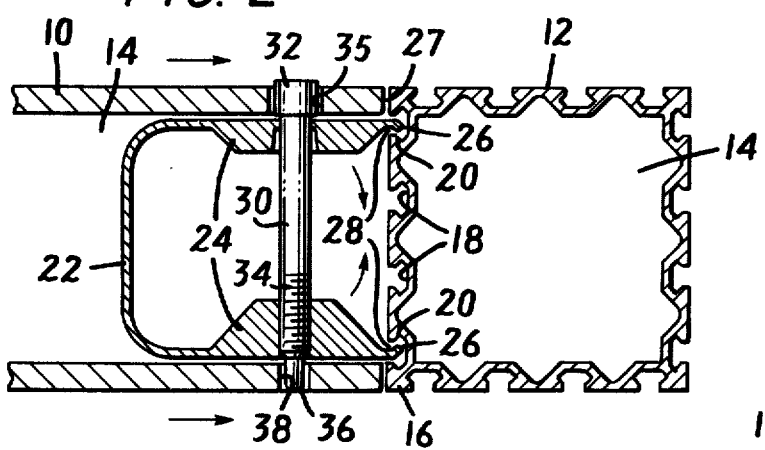
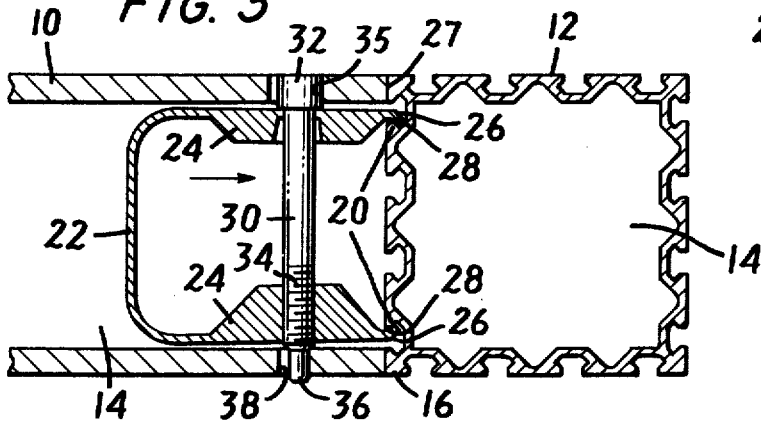
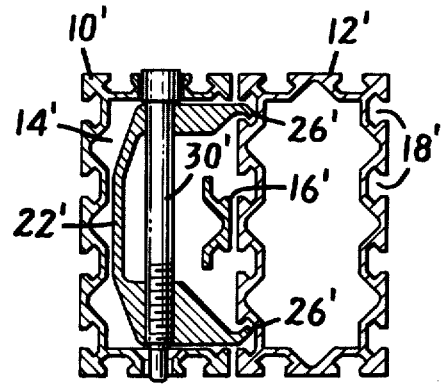

ASSEMBLY OF STRUCTURAL MEMBERS

BACKGROUND OF THE INVENTION

Standardized structural members are of wide utility as the building blocks of many modern structures. For example, such structural members are often used in erecting buildings and bridges. Even temporary structures such as scaffolding are now commonly erected from these structural members.

The structural members for temporary structures should meet several requirements. They should be easy to handle and of such design that a minimum number of different types of members are required for erecting a structure. Structures erected from the structural members must also be durable and stable for their intended use. For example, the dangers and difficulties of erecting sufficiently durable and stable scaffolding are so well-known as to have prompted many local regulations requiring licenses certifying those qualified to erect scaffolding.

In addition to these requirements, the temporary nature of such structures requires that the structural members and couplings used in their construction be easy to assemble and dismantle. Since the structural members are standardized, it is also desirable to have standardized devices for assembling these members. Ease of assembly dictates that the devices assembling the structural members also consist of as few different components as possible.

A variety of structural members are known. Many of these structural members are made from light metals in the shape of rails or tubes. These structural members are assembled with special couplings. For example, tubular members are familiarly assembled with sleeve couplings fitting about the tubular members and secured to the members by bolts. After repeated use, the portions of the structural members which interact with the couplings are particularly subject to undesirable deformation and wear from the tendency of the structural members to rotate relative to each other.

SUMMARY OF THE INVENTION

This invention relates to an assembly of structural members and, more particularly, to such an assembly formed by a coupling inserted in one structural member and having claws extending into gripping engagement with a groove in another structural member. The invention provides for such an assembly which may be both readily assembled and dismantled from a minimum of different parts and which avoids unnecessary deformation and wear after repeated use.

To this end, the invention comprises at least one structural member formed with an opening and at least one other structural member having grooves in its outer surface. In one preferred embodiment admitting of maximum standardization of the structural members, each structural member has both an opening and spaced, external grooves having inclined undercut sides.

The invention additionally comprises a coupling which is formed to be inserted within the opening in the one structural member. The coupling has yieldable body portions having claws adapted to be received within the grooves of the other structural member when the structural members are placed in assembled relation. A fastener in the coupling, the fastener also engaging the one structural member, then moves the yieldable body portions until the claws grippingly engage sides of the grooves in which they are received for assembling the structural members. In a preferred embodiment, the claws have inclined, groove-gripping surfaces which cooperate with the side of the grooves in the other structural member for urging the one structural member into butting engagement with the other whereby the stability of the assembly is improved.

DESCRIPTION OF THE DRAWINGS

A preferred embodiment illustrative of the invention will now be described with reference to drawings in which:

FIG. 1 is a perspective view, partly broken away, of a coupling assembling two structural members in a butt joint in accordance with the invention;

FIG. 2 is a plan, sectional view of the assembly shown in FIG. 1 when placed in assembled relation;

FIG. 3 is a plan, sectional view of the assembly shown in FIG. 2 in fully assembled relation; and FIG. 4 is a plan, sectional view of a coupling assembling two structural members in a flush joint in accordance with the invention.

DESCRIPTION OF THE PREFERRED EMBODIMENTS

FIG. 1 shows two identical, standardized structural members 10, 12. At one end each structural member has an opening defined by walls of the structural member. Outside surfaces 16 of the walls of the structural members have uniformly spaced, parallel grooves 18 extending longitudinally along the outer surfaces of the structural members. Each groove 18 has inclined, undercut sides 20 extending into the walls of the structural members to define the grooves.

A coupling 22 is formed to be inserted in the opening 14 of either structural member, for example, the structural member 10 as shown in FIG. 1. The coupling has yieldably spaced body portions 24, each body portion having a claw 26 which protrudes beyond an end face 27 of the structural member in which the coupling is inserted. Each claw has an inwardly inclined, groove-gripping surface 28 on a side of the claw facing the other claw. When the coupling is inserted in one structural member, the claws extend parallel to sides of the structural member and are spaced from each other at an integral multiple of the spacing between the grooves 18 so as to be received within different ones of the grooves of the other structural member when the structural members are placed in assembled relation as, for example, in the butt joint shown in FIG. 1.

A fastener 30 extends between the yieldably spaced body portions 24 of the coupling. At one end, the fastener has a head 32 which engages one body portion of the coupling; at the other end, the fastener has a portion 34 (FIG. 2) which is in threaded engagement with the other body portion. Rotation of the fastener 30 then moves the yieldably spaced body portions toward each other until the surfaces 28 on the claws grippingly engage sides of the grooves in which the claws are received to assemble the structural members.

FIG. 2 shows a cross-section through the two structural members 10, 12 when the members and the coupling 22 are merely placed in assembled relation. The coupling is then untensioned with the claws 26 in grooves 18 but not gripping the undercut sides 20 of the grooves.

The coupling 22 is a generally U-shaped device with the body portions 24 yieldably spaced from each other by a base portion of the coupling. The inward incline of the contact surfaces 28 on the claws is now seen to correspond to the incline of the undercut sides 20 of the grooves in the structural members. The inclined claw surface and groove undercut are thus designed to cooperate in drawing the coupling 22 toward the structural member 12 when the claws engage the grooves.

The head 32 of the fastener extends through a hole 35 in the structural member 10 to connect the coupling 22 to the member 10. The threaded portion 34 of the fastener extends through the body portion into which it is threaded and has an end projection 36 which further extends through a hole 38 in a side of the structural member 10 opposite the hole 35 to further connect the coupling to the member 10. The holes 35, 38 in the structural member 10 are so positioned that when the fastener extends through the holes and the body portions of the coupling, only the claws 26 of the coupling protrude from the end face 27 of the structural member 10. The coupling 22 is therefore first inserted in one internal opening 14 and the fastener 30 then inserted through the hole 35 and threaded into the body portion until the projection 36 extends into the hole 38.

FIG. 3 shows the coupling 22 in the structural member 10 after the fastener 30 has been tightened to move the yieldably spaced body portions 24 toward each other until the contact surfaces 28 of the claws grippingly engage the undercut sides 20 of the grooves in the structural member 12. As the claws engage the grooves, the cooperatively inclined surfaces 20, 28 draw the coupling 22 toward the structural member 12. Movement of the coupling moves the fastener 30 and the head 32 and projection 36 of the fastener engage sides of the holes 35, 38 in the structural member 10 to draw the structural member 10 into firm, butting engagement with one outside surface 16 of the structural member 12. The structural members 10, 12 are then assembled.

The claws preferably extend the full depth of the coupling to provide relatively long groove-gripping surfaces 28. As illustrated, the coupling is substantially the same size as the opening 14 so that the groove-gripping surfaces 28 extend substantially across the opening. However, couplings smaller than the opening 14 may also be used. For example, if the structural members are available in different sizes, the couplings may be of one or fewer different sizes to minimize the number of differently sized couplings necessary to erect a structure from the members.

The relatively long contact surfaces 28 of the claws prevent rotation of the structural members relative to each other which minimizes wear and deformation of the claws or the grooves while, at the same time, firmly gripping the structural member 12 to securely hold the structural member 10 against sliding relative to member 12 even under maximum load. The butting engagement of the end face 27 of the structural member 10 with the outside surface 16 of the structural member 12 provides added resistance to rotation of the members and improves the stability of a structure erected from the members.

FIG. 4 shows an alternative embodiment in which a structural member 10' is assembled in a longitudinal flush joint with a structural member 12'. The structural member 10' differs from the structural member 10 only in that the opening 14' which receives the coupling 22' additionally extends through a longitudinal outside face 16' of the member. The coupling 22' differs from the coupling 22 only in that it is configured to be inserted in the opening 14' with claws 26' protruding through the portion of the opening in the outside face 16' of the structural member.

The operation of the embodiment shown in FIG. 4 is similar to that described with reference to FIGS. 2 and 3. A fastener 30' extends through the coupling 22' and into holes in the structural member 10'. When the coupling 22' is inserted in the opening 14' and the structural members are placed in assembled relation, the claws 26' of the coupling extend into uniformly spaced, parallel grooves 18' in an outer surface of the structural member 12'. Tightening of the fastener then draws relatively yieldably body portions 24' of the coupling toward each other until contact surfaces of the claws grippingly engage sides of the grooves. The contact surfaces are inclined relative to inclined undercut sides of the grooves 18' to cooperatively draw the structural member 10' into firm butting engagement with the structural member 12' when the claws grip the grooves.

Other alternative embodiments are contemplated within the scope of the invention. For example, it may be desirable to provide structural members or couplings in a variety of different sizes. These differently sized structural members and couplings may be assembled in a single structure since the claws of the couplings may be spaced at different integral multiples of the spacing between the grooves. Diagonal braces may also be formed by providing a V-notch in an end of one structural member. In still another alternative embodiment, the structural members may have cross-sections other than the illustrated rectangles.

These and other alternative embodiments are contemplated within the invention in which I claim:

1. An assembly of structural members comprising one structural member having an opening in one surface thereof, another structural member having spaced, parallel grooves extending along an outer surface, and a coupling inserted in the opening, the coupling comprising:

yieldably spaced body portions, each body portion having a claw protruding from the opening and received in a different one of the grooves of the other structural member while the members are in assembled relation, each claw having an inclined, groove-gripping surface cooperative with the groove for drawing the coupling toward the grooved member when the claw grips the groove; and a fastener engaging the body portions for moving the body portions toward each other until the claws grip the grooves, the fastener also connecting the one structural member to the coupling for drawing the one structural member toward the other with the coupling until the structural members are in butting engagement.

2. Apparatus as defined in claim 1 wherein the grooves have inclined undercut sides cooperative with the inclined, groove-gripping surfaces of the claws for drawing the coupling toward the grooves when the claws grip the grooves.

3. Apparatus as defined in claim 1 wherein the fastener has a head at one end which engages one body portion of the coupling and engages one side of the one structural member in which the coupling is inserted, a threaded portion engaging another body portion for moving the body portions toward each other, and a projection at the threaded end engaging an opposite side of the one structural member from that engaged by the head.

4. An assembly of structural members comprising one structural member having an opening in one surface thereof, another structural member having spaced, parallel grooves extending along an outer surface, each groove having an inclined, undercut side, and a coupling inserted in the opening, the coupling comprising:
 yieldably spaced body portions, each body portion having a claw protruding from the opening and received in a different one of the grooves of the other structural member while the members are in assembled relation; and
 a fastener engaging the body portions for moving the body portion toward each other until the claws grip the inclined sides of the grooves for drawing the coupling toward the other structural member, the fastener also connecting the one structural member to the coupling for drawing the one structural member toward the other with the coupling until the structural members are in butting engagement.

5. Apparatus for assembling structural members comprising:
 two structural members each having an opening in one surface thereof and spaced, parallel grooves along but not through an outer surface, each groove having inclined, undercut sides;
 a generally U-shaped coupling inserted in the opening of one of the structural members and having yieldably spaced body portions;
 a claw on each body portion protruding from the opening in the one structural member and received in different ones of the grooves on the other structural member while the members are in assembled relation;
 an inclined groove gripping surface on each claw cooperative with the inclined sides of the grooves in which the claws are received for drawing the coupling toward the other structural member when the claws grip the sides of the grooves; and
 a fastener engaging the body portions of the coupling for moving the body portions toward each other until the claws grip the sides of the grooves, the fastener also having a head and a projection at opposite ends which are received in opposite sides of the one structural member for connecting the coupling to the one structural member whereby the one structural member moves with the coupling toward the other structural member until the structural members are in butting engagement.

* * * * *